US007016534B2

(12) United States Patent
Fukawa et al.

(10) Patent No.: US 7,016,534 B2
(45) Date of Patent: Mar. 21, 2006

(54) METHOD, AND APPARATUS FOR DISCRIMINATING KIND OF IMAGE MEDIUM STORED WITH PROGRAM

(75) Inventors: Kimihiko Fukawa, Ibaraki (JP); Yoichiro Makino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 547 days.

(21) Appl. No.: 10/211,520

(22) Filed: Aug. 5, 2002

(65) Prior Publication Data

US 2003/0043410 A1 Mar. 6, 2003

(30) Foreign Application Priority Data

| | | | |
|---|---|---|---|
| Aug. 7, 2001 | (JP) | ............................. | 2001-239139 |
| Aug. 7, 2001 | (JP) | ............................. | 2001-239140 |
| Jan. 11, 2002 | (JP) | ............................. | 2002-005181 |

(51) Int. Cl.
*G06K 9/00* (2006.01)
*G06K 9/62* (2006.01)

(52) U.S. Cl. ....................................... 382/168; 382/224

(58) Field of Classification Search ................ 382/130, 382/162, 168–170, 172, 274, 300, 224, 190; 358/2.1, 518, 521–524, 530
See application file for complete search history.

(56) References Cited

U.S. PATENT DOCUMENTS

| | | | | |
|---|---|---|---|---|
| 4,830,501 A * | 5/1989 | Terashita | .................... | 356/402 |
| 5,048,110 A * | 9/1991 | Nakajima | ................... | 382/130 |
| 5,123,060 A * | 6/1992 | Cho et al. | ................... | 382/274 |
| 5,412,737 A * | 5/1995 | Govrin | ....................... | 382/168 |
| 5,805,723 A * | 9/1998 | Fujiwara | ..................... | 382/172 |
| 5,937,090 A * | 8/1999 | Kim | ........................... | 382/169 |
| 6,009,193 A * | 12/1999 | Mita | .......................... | 382/168 |
| 6,055,331 A * | 4/2000 | Nakamura | .................. | 382/168 |
| 6,433,898 B1 * | 8/2002 | Bestmann | ................... | 358/518 |
| 2003/0043410 A1 * | 3/2003 | Fukawa et al. | .............. | 358/2.1 |

* cited by examiner

*Primary Examiner*—Andrew W. Johns
*Assistant Examiner*—Amir Alavi
(74) *Attorney, Agent, or Firm*—Fitzpatrick, Cella, Harper & Scinto

(57) ABSTRACT

A histogram of density difference between each pixel and an adjacent pixel is prepared from the image data obtained by pre-scanning an original. Then an approximation function for the density difference histogram is generated, and the kind of the original is discriminated as text/photograph/other based on the coefficient of the approximation function. According to the kind of the original, a density conversion table matching each kind is prepared, and is used for density correction of the image obtained by main scanning. For a text original, the density conversion table is prepared from the distribution of data close to the light and dark ends of the density histogram. For a photograph original, the density conversion table is prepared from the coefficient of the approximation function for the cumulative histogram of the density histogram.

5 Claims, 18 Drawing Sheets

TEXT IMAGE

GAMMA TABLE FOR DARK IMAGE

METHOD, AND APPARATUS FOR DISCRIMINATING KIND OF IMAGE MEDIUM STORED WITH PROGRAM

BACKGROUND OF THE INVENTION

1. Field of the Invention

The present invention relates to an image processing apparatus and a processing method therefor, and more particularly to an image processing apparatus for classifying the input image and converting it into density characteristics suitable for the kind of the image, and a processing method therefor.

2. Related Background Art

As a process function of an image input apparatus or an original copying apparatus, it is commonly executed to classify the input image data according to the kind of the image, and to execute a filtering process, a γ correction etc. suitable for the property of the original image to be processed, thereby improving the quality of the image.

There have been conceived various processing methods for classifying the kinds of the images. In most of these methods, a feature amount corresponding to the kind of the image is extracted and is evaluated by an evaluation function or a discrimination function determined in advance, thereby determining the kind of the image. The feature amount is often the generation frequently of black pixels or edges within a predetermined block area in the image, a histogram of the density levels, a spatial frequency distribution, or a directional distribution of lines.

The filtering process is to enhance or improve a localized feature of the image thereby improving the image quality of the original image, and includes an integrating filter for alleviating noise texture, and a differential filter for enhancing the edges in the image thereby providing the image with a more vivid feeling.

The γ correction executes tonal correction for the image density. Examples of tonal correction for the image density include a process of uniformly extending or compressing the dynamic range of the density values, and a non-linear conversion of extending or compressing a particular density range in contrast to other ranges.

SUMMARY OF THE INVENTION

The object of the present invention is to provide an image processing apparatus and a processing method therefor, capable of classifying the kind of the input image based on the feature of the input image, and effecting density correction according to each kind.

To achieve the above object, the method of and the apparatus for reading images according to the present invention is constructed as follows.

An image processing method comprising the steps of:

detecting the density difference of each pixel in the input image from the adjacent pixels;

generating a histogram of the density differences detected in the density difference detecting step;

generating a function approximating the histogram generated in the histogram generation step; and discriminating the kind of the input image from the coefficient of the function generated in the approximation function generating step.

An image processing method comprising the steps of:

reading an original and generating input image data;

calculating the sharpness of the input image from the input image data;

discriminating whether the original is a text original or a photograph original from the sharpness of the input image; and applying, in case the original kind discrimination step discriminates that the original is a text original, a density correction process to the input image obtained by reading the original;

wherein the text image density correction step includes:

a density histogram generation step of generating a density histogram from the input image;

a density correction curve generation step of generating a density correction curve based on a ratio of the number of data close to the light and dark ends in the histogram to the total number of data in the histogram; and a density correction step of executing density correction on the input image, based on the density correction curve generated in the density correction curve generation step.

An image processing method comprising the steps of:

reading an original with a first reading condition to generate input image data;

calculating the sharpness of the input image from the input image data;

discriminating whether the kind of the original is a text original or a photograph original, based on the sharpness of the input image; and applying, in case the original kind discrimination step discriminates that the original is a photograph original, a density correction process to the input image obtained by reading the original;

wherein the photograph image density correction step includes:

a density histogram generation step of generating a density histogram from the input image;

a cumulative histogram generation step of cumulating the frequency of density level values in an increasing direction of the density level value, taking the minimum density level value of data of the density histogram obtained in the density histogram generation step as a reference and starting point of cumulating operation, thereby obtaining a cumulative histogram indicating the relationship between the density level value and the cumulated value;

a first γ value obtaining step of calculating an approximation exponential function approximating the density histogram and obtaining a first γ value indicating the density correction coefficient of the input image from the exponent of thus calculated function; and a first density correction step of executing a density correction process of the input image, based on the first γ value.

DESCRIPTION OF THE PREFERRED EMBODIMENTS

Now the present invention will be clarified in detail by preferred embodiments thereof, with reference to the accompanying drawings.

At first there will be explained the outline of the operations of the image processing apparatus embodying the present invention according to flow charts, and then there will be explained a discrimination process for the kind of the original, constituting the main feature of the present invention.

Figure 1:
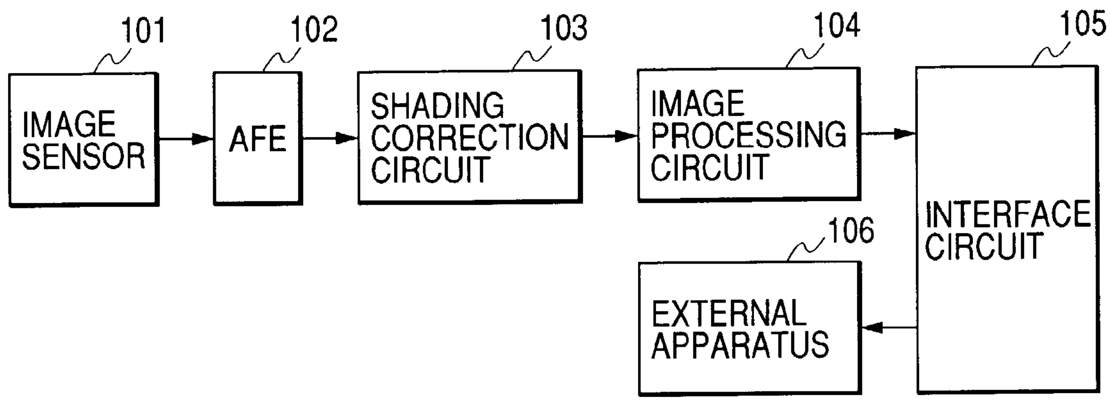
FIG. 1 is a block diagram showing the configuration of an image reading apparatus embodying the present invention.
Figure 2:
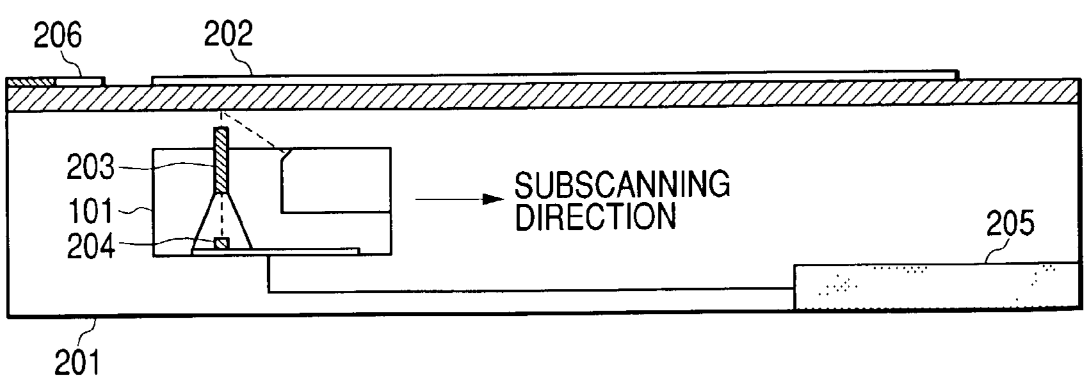
FIG. 2 is a cross-sectional view of the image reading apparatus embodying the present invention.

FIG. 1 is a block diagram showing the schematic configuration of an image reading apparatus embodying the present invention, and FIG. 2 is a cross-sectional view of the image reading apparatus embodying the present invention.

Referring to FIGS. 1 and 2, an image sensor unit 101 irradiates an original 202 to be read, with the light from a light source. The light reflected from the original 202 is received through a lens 203 by an image pickup device 204, and is photoelectrically converted therein. The image sensor 101 is moved in the sub scanning direction along the original, and the color image is read in line-sequential manner of R, G and B colors for each line (or in point-sequential manner).

The electrical signal, obtained by photoelectric conversion in the image pickup device 204, is supplied to an electrical board 205 in an image reading apparatus 201. The electrical board 205 is provided with units 102~105 shown in FIG. 1 and executes following processes on the electrical signal supplied from the image sensor. An AFE 102 is an analog preprocessor for applying amplification, DC offset correction, A/D conversion etc. on the electrical signal outputted from the image sensor 101 to finally output digital image data for example of 12 bits.

A shading correction circuit 103 stores a reference level data prepared by reading a reference white board provided outside the original reading area with the image sensor 101, as shading correction data, and executes shading correction on the image data generated by reading the read original, utilizing such correction data. The shading correction data are stored, after the acquisition thereof, in an external memory apparatus 106, and the data required in the scanning operation are downloaded to the image reading apparatus of the present embodiment.

A data processing circuit 104 executes for example a packing process according to an image reading mode (for example binary or 24-bit multi-value) designated in advance from an external apparatus 106.

An interface circuit 105 executes exchange of control signals with or outputs an image signal to the external apparatus 106 such as a personal computer, constituting the host apparatus of the image reading apparatus of the present embodiment.

An external apparatus 106 is composed of a host computer, and is provided with a scanner driver for controlling the image reading apparatus. The external apparatus 106 and the image reading apparatus integrally constitute an image processing system.

The scanner driver is provided with a user interface for instructing the image reading mode, resolution, image reading area etc. and transmits control signals or a reading start command etc. based on such the instruction to the image reading apparatus through the interface circuit 105. The scanner driver also executes an image display, by processing in succession the image data read by the image reading apparatus according to the control signal. In such operation, the scanner driver executes a gamma correction process of the present embodiment.

The image processing apparatus of the present embodiment is provided with a function of discriminating, based on a preview image read with a low resolution, the kind of the original image as one of text original, photograph original and another original, then operating a density conversion table (hereinafter called γ table) prepared for each kind of the original, and optimizing the density of a main scan image to be read subsequently.

Figure 3:
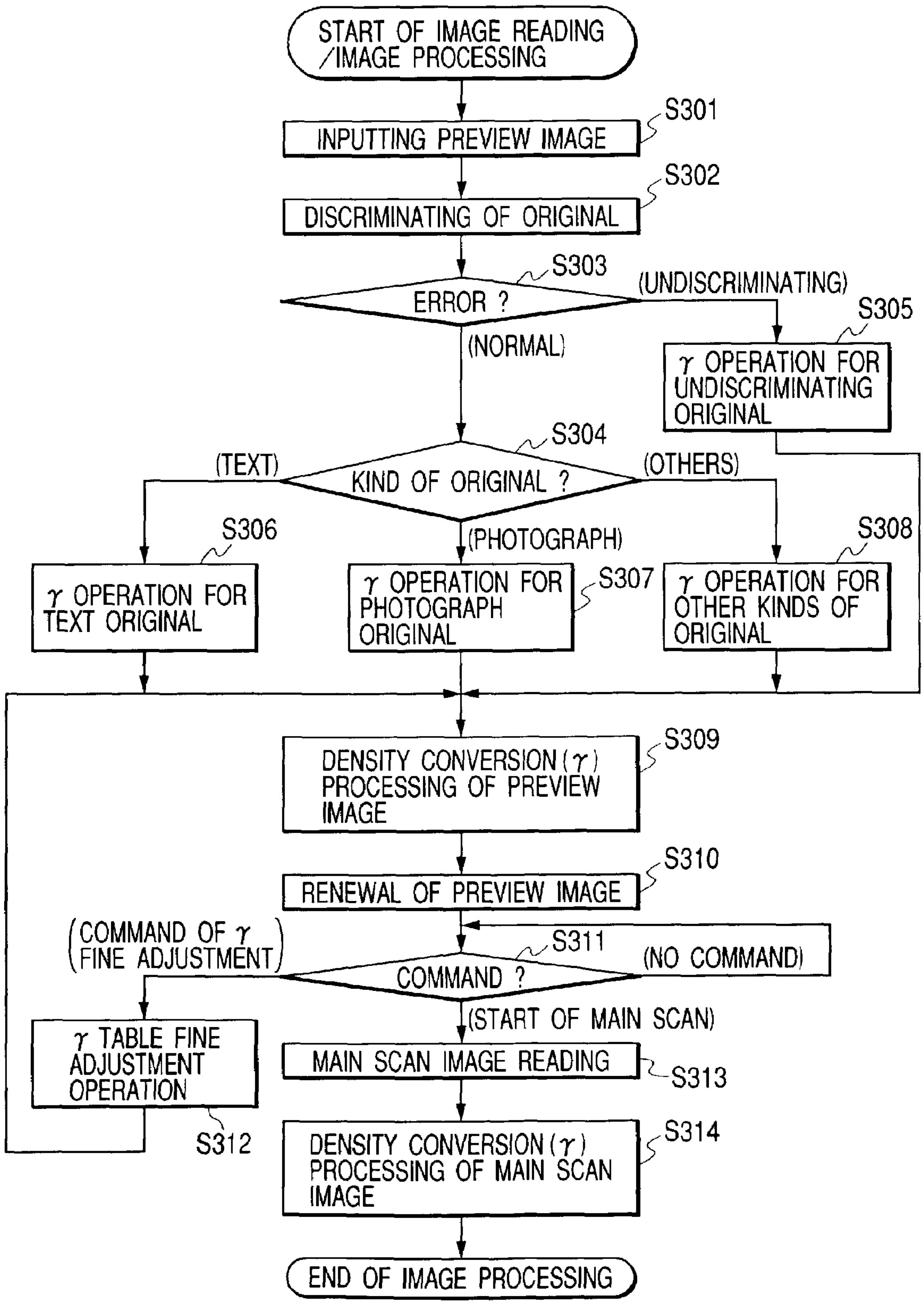
FIG. 3 is a flow chart showing the schematic process sequence of the image processing apparatus embodying the present invention.

FIG. 3 is a flow chart showing the schematic process sequence of the image processing apparatus of the present embodiment, and such process sequence will be explained in the following with reference to this flow chart.

The image processing apparatus receives a preview image of a relatively low resolution, read for example with the image reading apparatus, and also receives, at the same time, a position on the preview image of a main scan reading area to be finally stored (step S301).

The image processing apparatus discriminates, by an image kind discriminating procedure to be explained later in more details, the kind of image of the designated reading area on the preview image as either one of text original, photograph original and another original (step S302). In case all the pixels in the designated area of the preview image have a same value, for example a solid white or black image, the discrimination is judged impossible. In such case the density distribution of the original is not adjusted and there is prepared a through γ-table (steps S303, S305). In such through γ-table, the input values directly become the output values.

In the discrimination of the kind of the image is completed in normal manner (step S304), there is executed an operation of generating a γ-table according to the result of such discrimination and the density distribution within the designated area in the preview image (step S306, S307, S308). The details of this operation will be explained later.

Then the γ-table, calculated from the image kind of the preview image and the density distribution, is used for executing density conversion of the preview image (step S309), and an image showing the result of such correction is displayed to the operator (step S310). If the image satisfies the intention of the operator, the sequence proceeds to a request for the main scan data, but, if necessary, there is executed a fine adjustment of the γ-table (step S312) and the preview image display is renewed again (step S310) to await a further instruction of the operator (step S311).

Subsequently, the image reading apparatus reads the original with a resolution instructed by the operator (step S310, main scanning operation). Upon receiving the original image (main scan image), the image processing apparatus executes optimization of the density distribution, utilizing the γ-table established in advance, thereby preparing image data subjected to adjustment of density gradation optimum to the content of the original image (step S314).

In the foregoing description, the optimization of the density distribution of the main scan image based on the γ-table is executed by the image processing apparatus, but, if the image reading apparatus is equipped with the γ-table and is capable of executing the density conversion process, there can also be adopted a configuration in which the γ-table is transferred from the image processing apparatus to the image reading apparatus prior to the main scanning operation and the optimization of density distribution is executed in the image reading apparatus.

Discrimination of Kind of Original

In the following the image kind discriminating procedure of the present embodiment will be explained in detail, with reference to a flow chart and an example of the frequency distribution.

Figure 4:
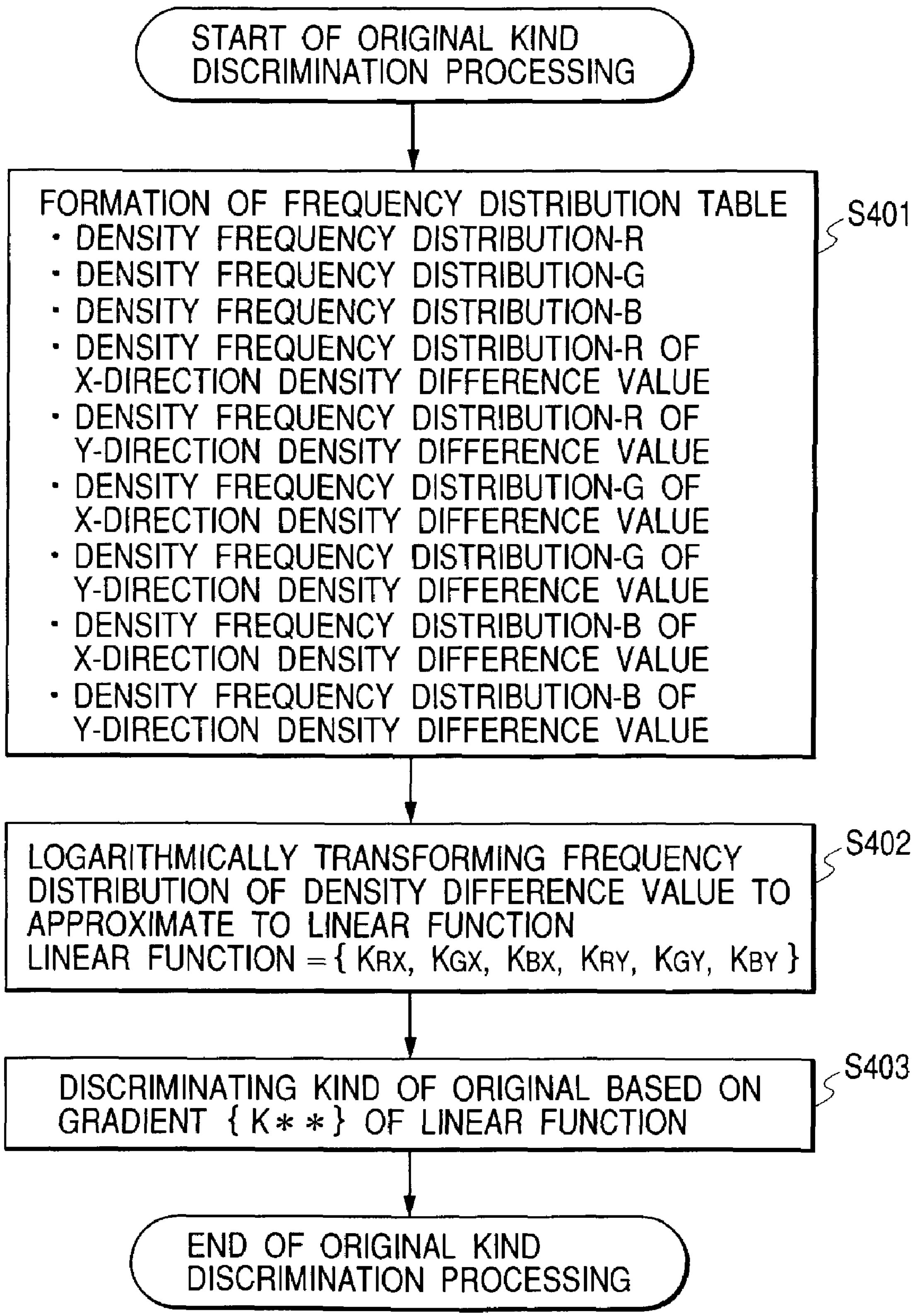
FIG. 4 is a flow chart showing an original kind discrimination process of the image processing apparatus embodying the present invention.

FIG. 4 is a flow chart showing the original kind discrimination process of the image processing apparatus of the present embodiment.

Figure 5:
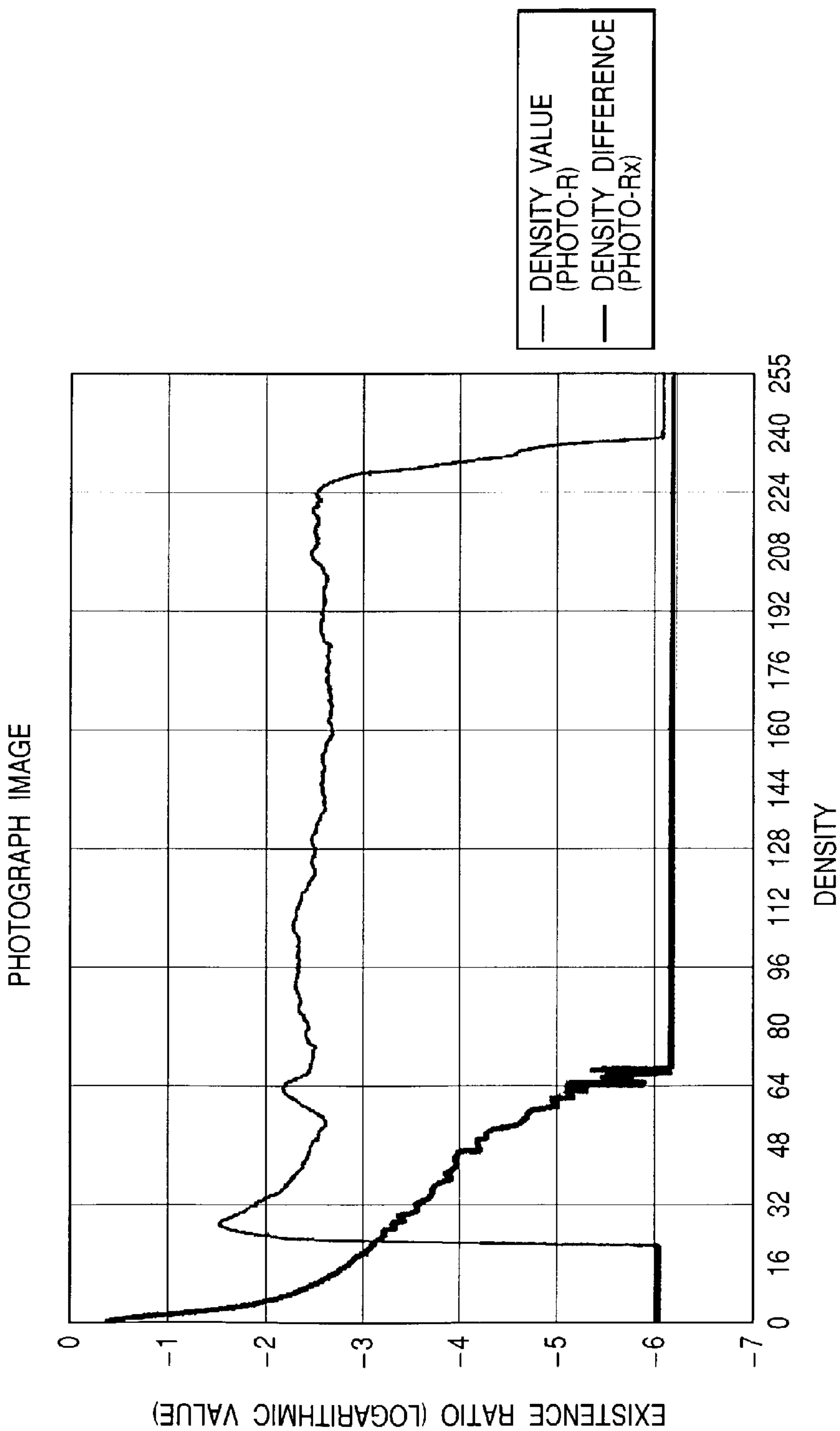
FIG. 5 is a chart showing the frequency distribution of density of R color in a photograph image and the frequency distribution of density difference of R color between the adjacent pixels in the X-direction.
Figure 6:
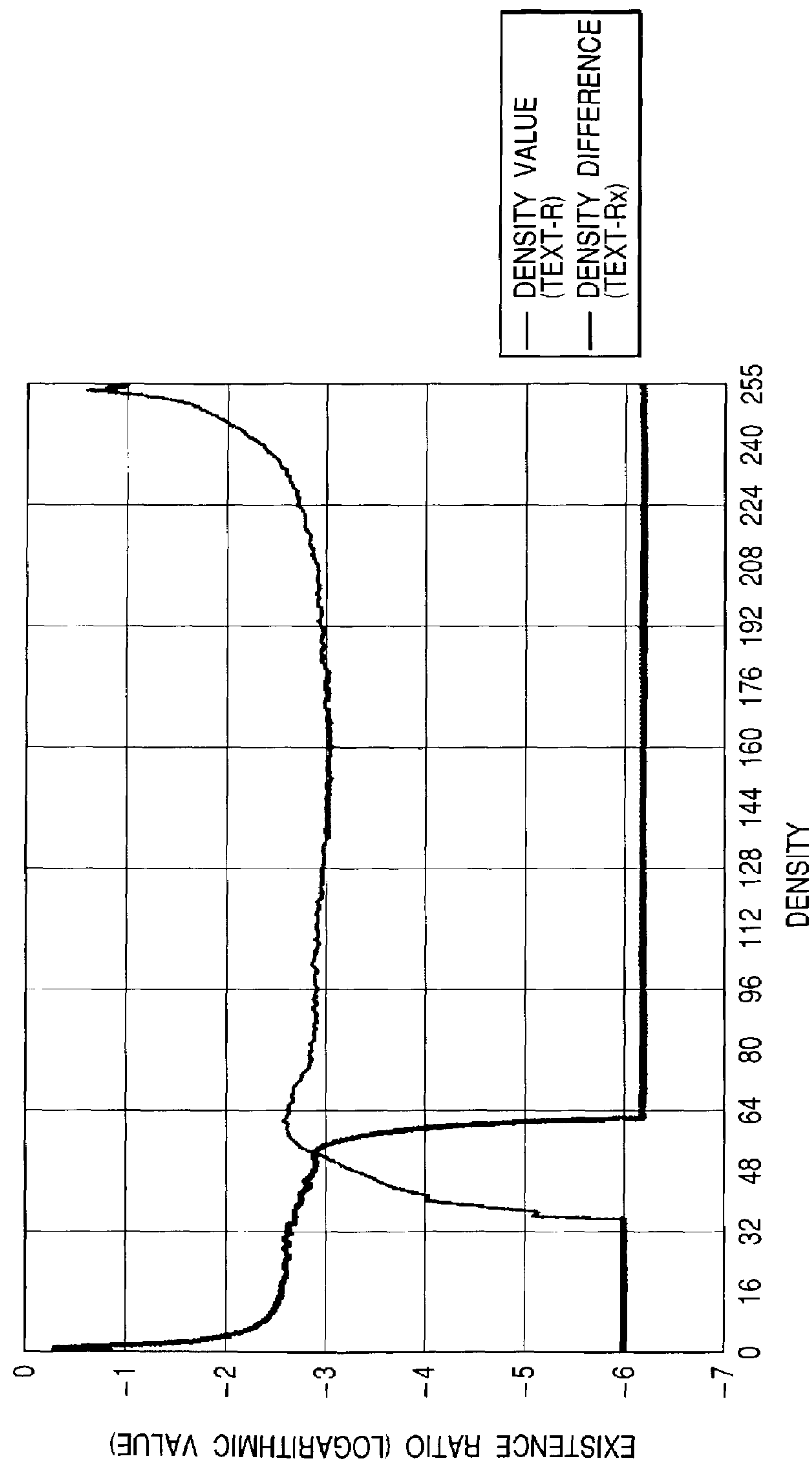
FIG. 6 is a chart showing the frequency distribution of density of R color in a text image and the frequency distribution of density difference of R color between the adjacent pixels in the X-direction.

FIGS. 5 and 6 show the density frequency distribution (0 corresponding to black and 255 corresponding to white) of R color in a photograph image and a text image, and the frequency distribution of the density difference of R color to the adjacent pixel in the X-direction (horizontal direction of the image). The abscissa represents the density of each pixel for the density frequency distribution represented by a thin line, and the absolute value of the density difference for the frequency distribution of the density difference represented by a thick line. However, in FIGS. 5 and 6, the ordinate indicates the ratio of the frequency relative to the total pixel number in logarithmic scale with a base of 10. Thus, pixels having a density value of −3 on the ordinate represent 0.1% of the total pixels.

Figure 7:
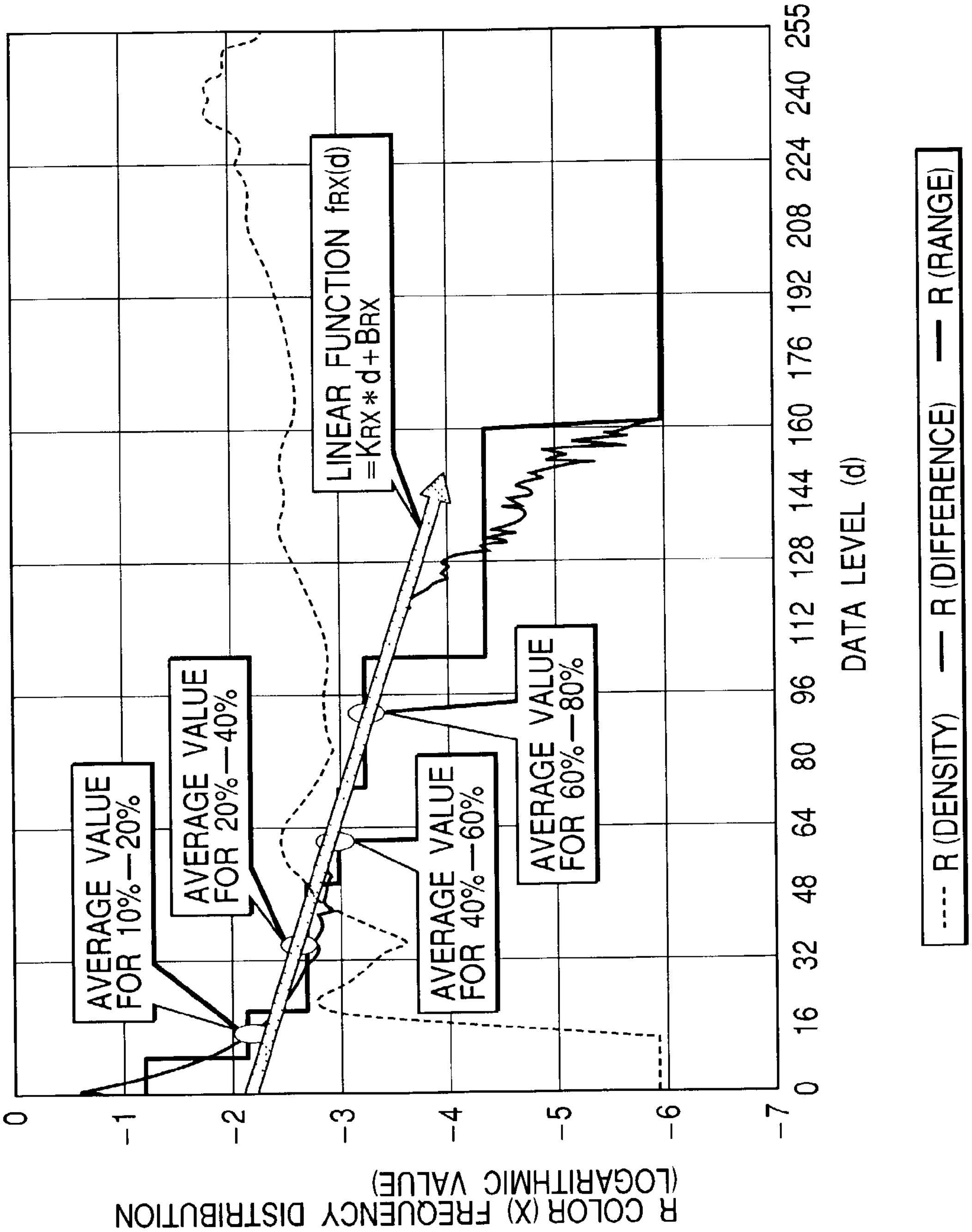
FIG. 7 is a view illustrating the data processing in the image kind discrimination process in an embodiment of the present invention.

FIG. 7 illustrates a procedure, in an example of frequency distribution of an image in which photograph and text are mixed, of calculating a feature amount KRX from the frequency distribution of the density difference in R color from the adjacent pixel in the X-direction.

As shown in the flow chart in FIG. 2, the image kind discrimination process calculates the frequency distribution of density for each color, and also calculates the density difference between the pixels adjacent in the vertical direction (Y-direction) or in the horizontal direction (X-direction), thereby obtaining the frequency distribution of the density difference (step S401).

After the calculation of the frequency distribution of the density difference of all the pixels, the frequency of a density difference 0 is doubled. Since the density difference is calculated by the absolute value, so that the density difference of 1 or larger includes the density changes both in the positive and negative directions. In comparison, the probability of a density difference 0 becomes ½, and the above-mentioned doubling operation intends a correction for such difference in the probability.

The frequency distribution of density (for example for R color) and the frequency distribution of density difference (for example in X-direction in R color), prepared in the above-described procedure, assume forms as shown in FIGS. 5 and 6 or in FIG. 5, depending on the image. In a photograph original, as shown in FIG. 5, the frequency of the density difference monotonously decreases with the increase in the density difference, while, in a text original, as shown in FIG. 6, there exists a range in which the frequency of the density difference remains almost same regardless of the density difference (a substantially horizontal portion in the thick-lined curve).

The present original kind discrimination process, utilizing the above-described feature in the frequency distribution of the density difference, approximates the central portion of such frequency distribution of density difference by a first-order function and adopts the inclination thereof as a feature amount parameter. The operation procedure will be explained in the following with reference to FIG. 7.

At first there is calculated the total cumulative value of an area surrounded by the minimum value of the density difference frequency distribution (about −6 in FIG. 7), the curve indicating the density difference frequency distribution and the Y-axis. Then there are searched, from the side of the density difference 0, density difference values where the cumulative value reaches 10, 20, 40, 60 and 80% of the total cumulative value, and an average value is calculated in each of the sections 10% to 20%, 20% to 40%, 40% to 60% and 60% to 80% to determine four representative points, represented by white oval marks in FIG. 7. Thereafter a straight line passing through the four representative points:

$$fRX(d)=KRX*d+BRX \quad (1)$$

is operated by the least square method.

Similarly first-order functions representing the features of the density difference frequency distributions are calculated utilizing the density difference frequency distribution in the Y-direction and those of G and B colors to obtain inclination coefficients KRX, KGX, KBX, KRY, KGY, KBY (step S402).

The kind of the original is discriminated utilizing the feature amount parameters calculated in the above-explained procedure and referring to predetermined plural discrimination criteria (step S403). In the following there is shown an example of the discrimination criteria:

Discrimination Criterion 1:

The original is discriminated as a photograph original if: {KRX<Tp1} and {KGX<Tp1} and {KBX<Tp1} and {KRY<Tp1} and {KGY<Tp1} and {KBY<Tp1}:

Discrimination Criterion 2:

The original is discriminated as a text original if: {KRX>Tt1} and {KGX>Tt1} and {KBX>Tt1} and {KRY>Tt1} and {KGY>Tt1} and {KBY>Tt1}:

Discrimination Criterion 3:

The original is discriminated as a text original if: {{{KRX>Tt1} and {KRY>Tt1}} or {{KGX>Tt1} and {KGY>Tt1}} or {{KBX>Tt1} and {KBY>Tt1}}} and {{KRX>Tp2} and {KGX>Tp2} and {KBX>Tp2} and {KRY>Tp2} and {KGY>Tp2} and {KBY>Tp2}.

The original is discriminated as another original if none of these discrimination criteria is met.

In the foregoing, Tp1, Tp2, Tt1 are constants determined experimentally in advance.

The discrimination criterion 1 or 2 indicates the conditions that the feature amount parameters in all the colors and all the directions represent a photograph original or a text original. Also the discrimination criterion 3 provides composite conditions that none of the feature amount parameters is discriminated as a photograph original and any one of the colors is discriminated as a text original. This discrimination criterion is provided for detecting an original in which the text is represented in one color only, and the accuracy of discrimination can be improved by adding discrimination criteria according to the features of the existing originals.

In the following there will be explained the procedure of generating a density conversion table optimum for the original density distribution, with reference to the accompanying flow chart.

Density Conversion Table for a Text Original

Figure 8:
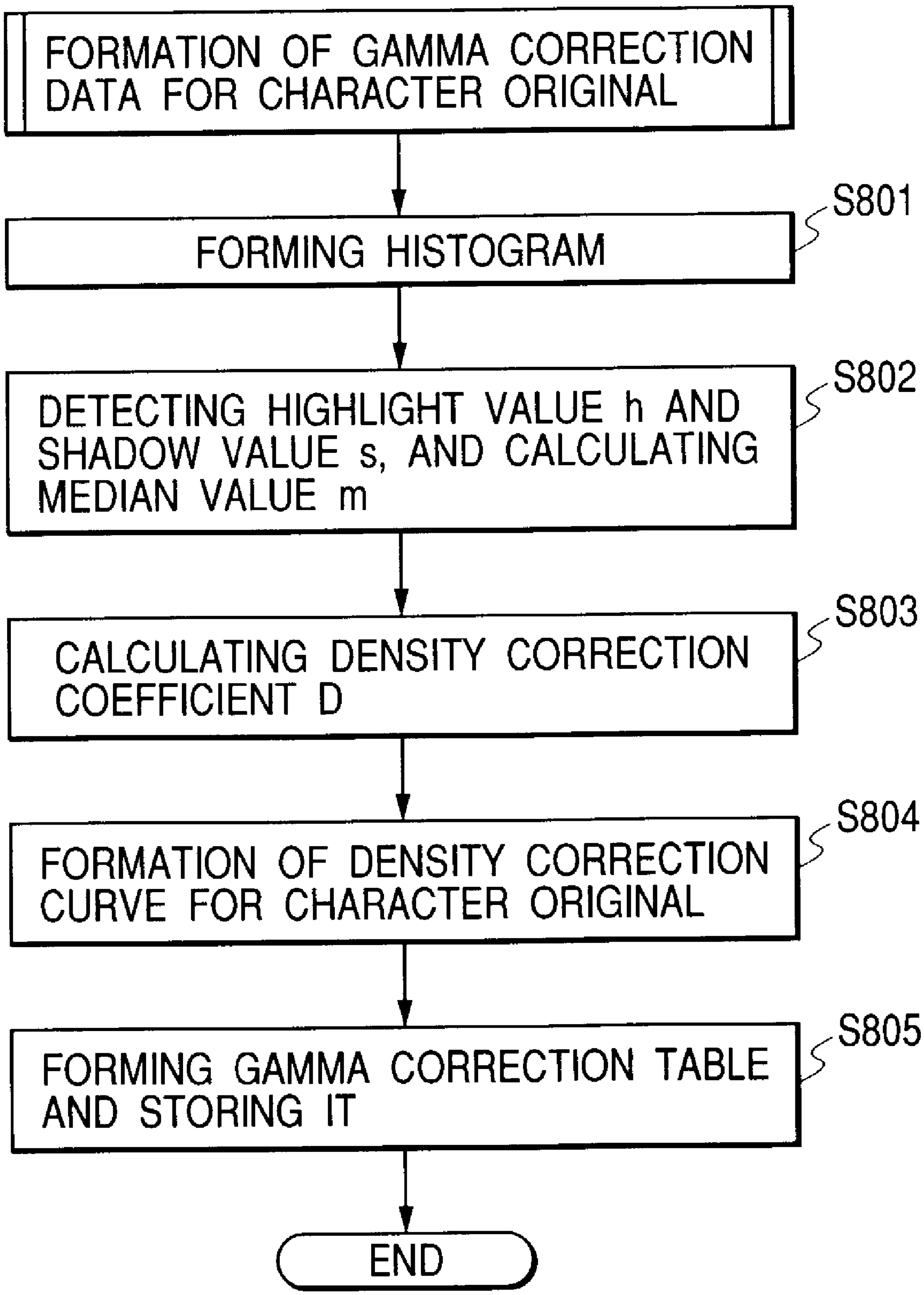
FIG. 8 is a flow chart of preparing γ correction data for a text original in the image reading apparatus embodying the present invention.

FIG. 8 shows a routine for preparing gamma correction data for a text original, in the step S306 shown in FIG. 3.

Figure 9:
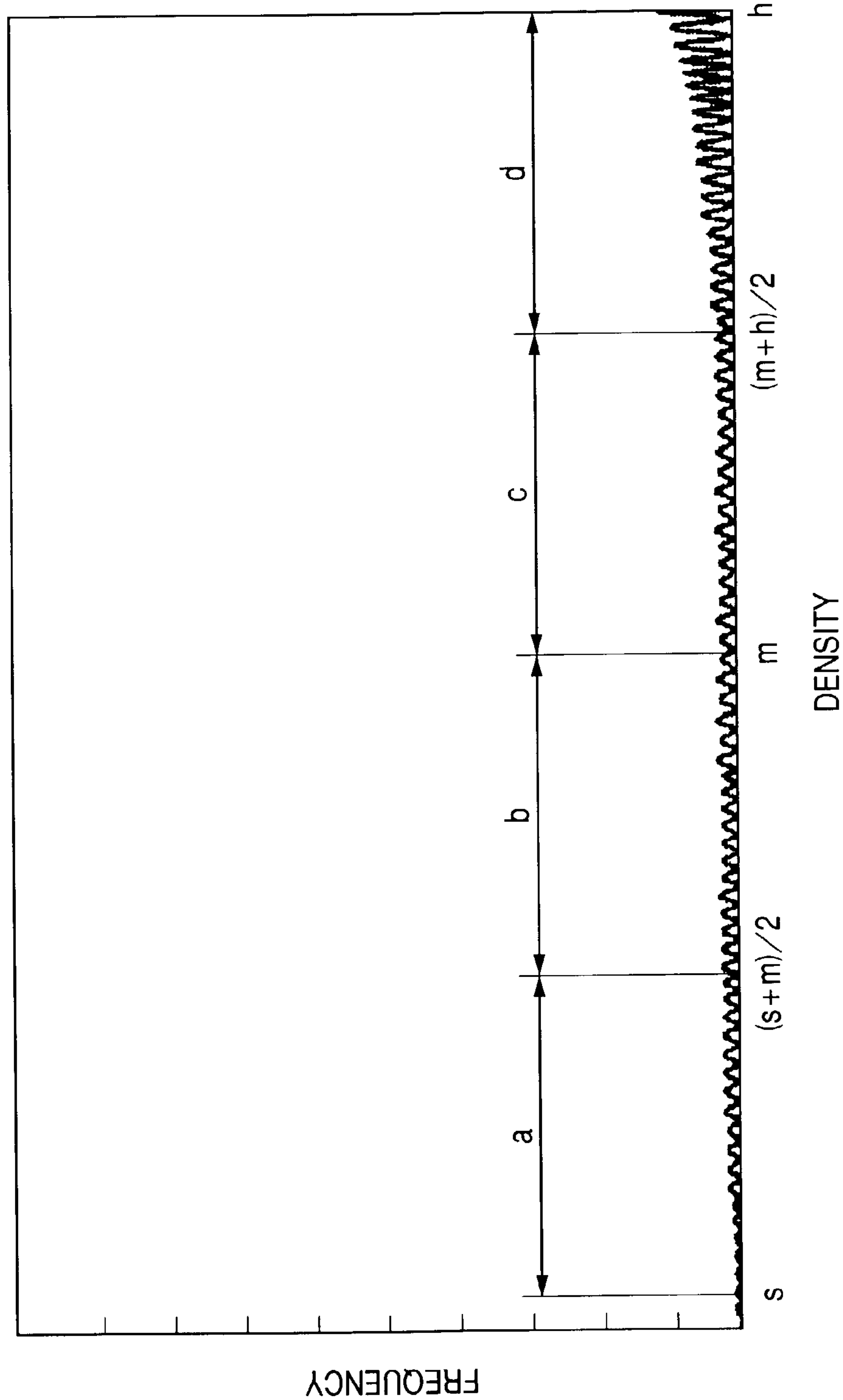
FIG. 9 is a view showing an example of the histogram of a text original image in an embodiment of the present invention.

At first, a step S801 generates a histogram by synthesizing all the R, G and B colors in case of a color mode as shown in FIG. 9, or a histogram of G color only in case of a gray mode. Then a step S802 searches a shadow value s and a highlight value h from the histogram and calculates a medium value m. Then the ranges from the shadow value to the medium value and from the medium value to the highlight value are respectively divided into two, thereby forming four sections [s, (s+m)/2], [(s+m)/2, m], [m, (m+h)/2] and [(m+h)/2, h]. A step S803 determines the cumulative values a, b, c, d of the frequencies of the respective sections and calculates a density correction coefficient D=(a+d)/(a+b+c+d).

Figure 10:
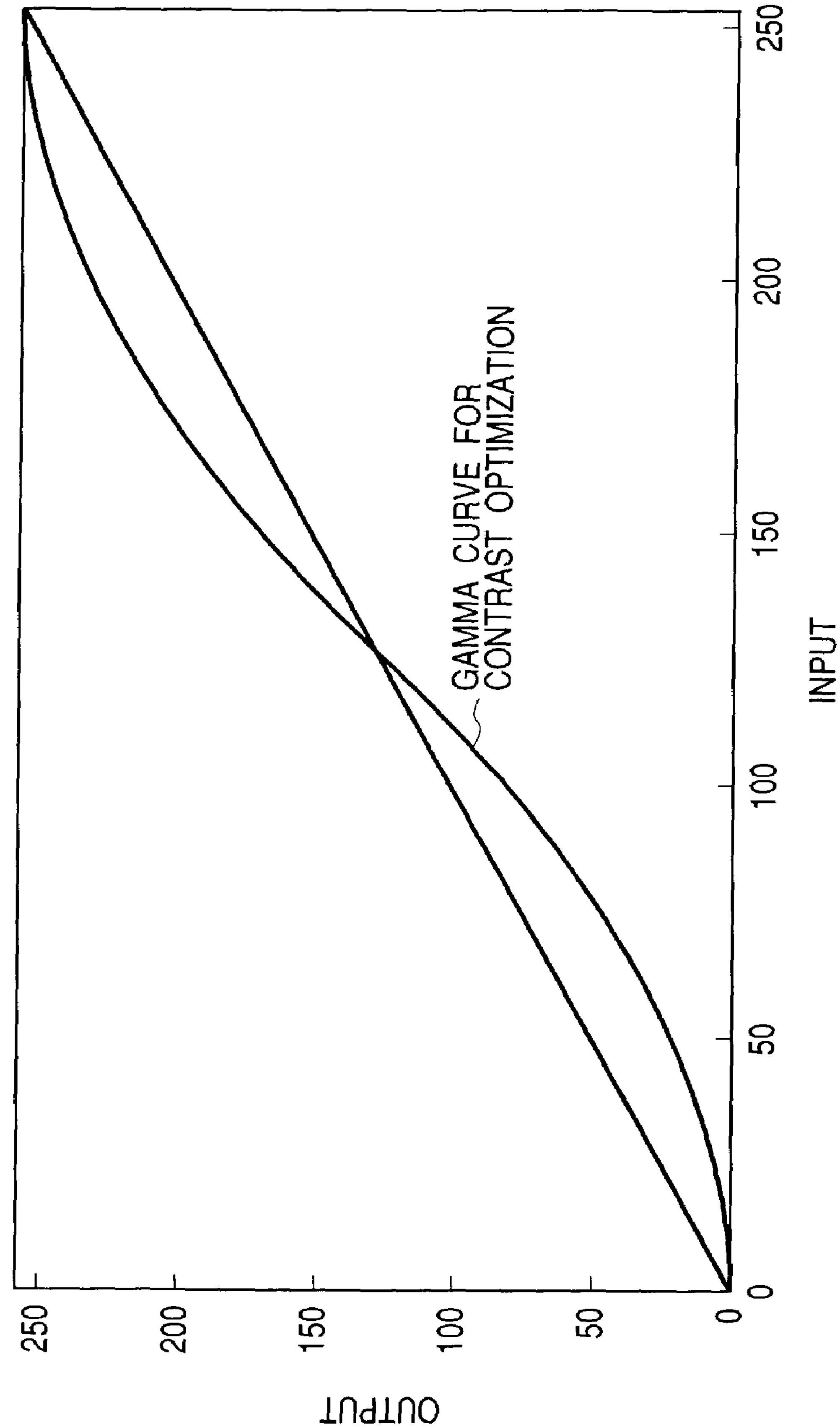
FIG. 10 is a view showing an example of a tone curve for a text original image in an embodiment of the present invention.

Upon determination of the density correction coefficient D, a step S804 generates an S-shaped text original density correction curve which provides an output f(x)=m×(x/m)^(1/D) for the data x of the section [s, m] and an output g(x)=N−(N−m)×((N−x)^(1/D) for the data x of the section [m, h] (FIG. 10), wherein N indicates the number of gradation level bits of the pixel and can be represented by N=(2^n)−1. Note that an operator A^B means A to the power of B. N=255 for a number of gradation levels of 8 bits. With such tone curve, a weaker or stronger S-shaped density correction is applied on the original image data for a larger or smaller density correction coefficient D.

Figure 11:
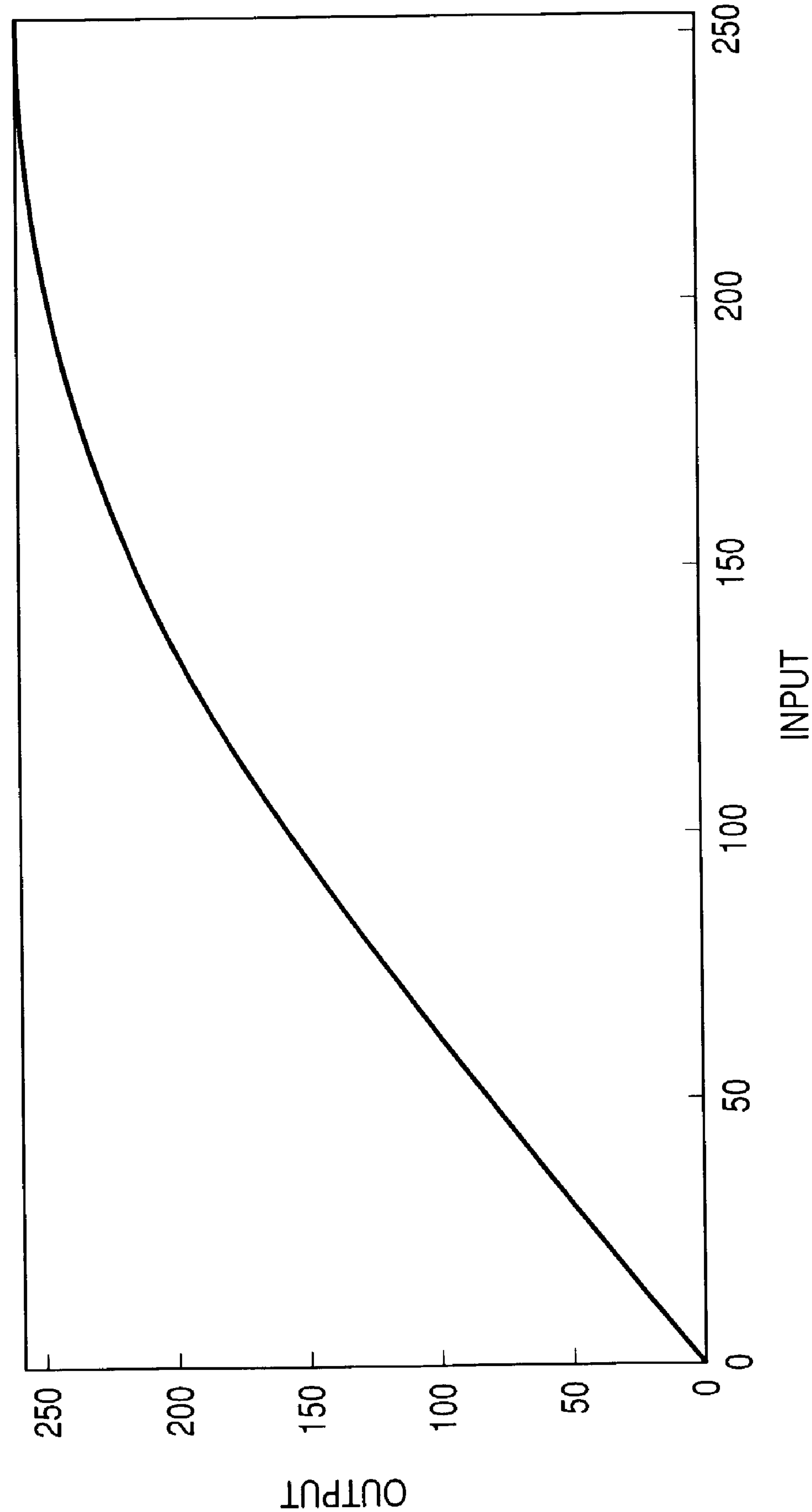
FIG. 11 is a view showing an example of a tone curve of γ correction data for monitoring in an embodiment of the present invention.

Upon determination of the text original density correction curve, a step S805 executes synthesis with a monitoring gamma correction curve (FIG. 11), and stores the input/output table data as the text original gamma correction data in the external apparatus 6. In the image data correction in the color mode, the prepared text original gamma correction data are commonly used as the correction data for the color data of R, G and B colors. FIG. 11 shows a synthesized curve when the monitoring gamma value is selected as γ=2.2.

Density Conversion Table for Photograph Original

Figure 12:
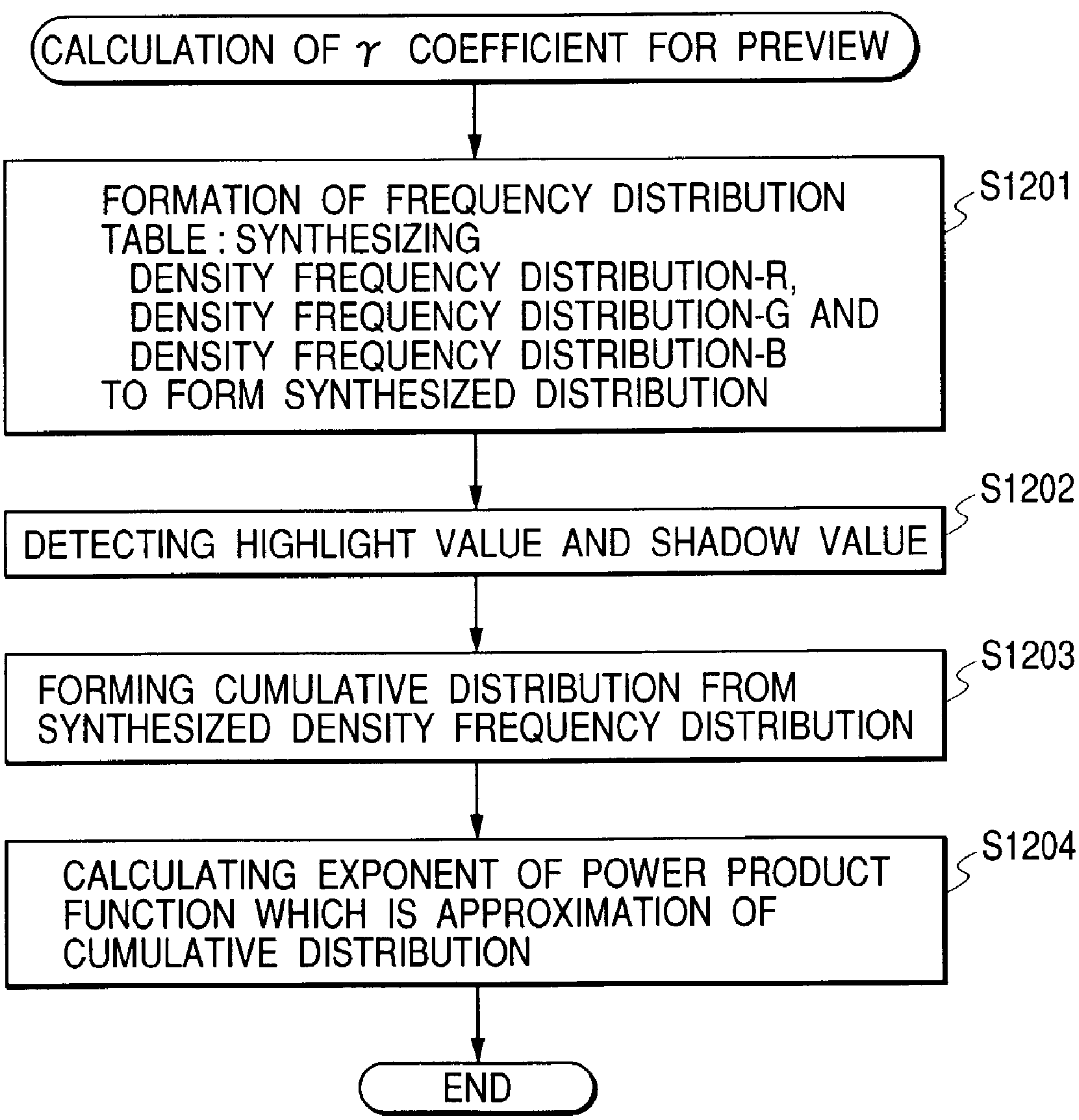
FIG. 12 is a flow chart showing a γ coefficient calculation process for preview in the image processing apparatus embodying the present invention.
Figure 13:
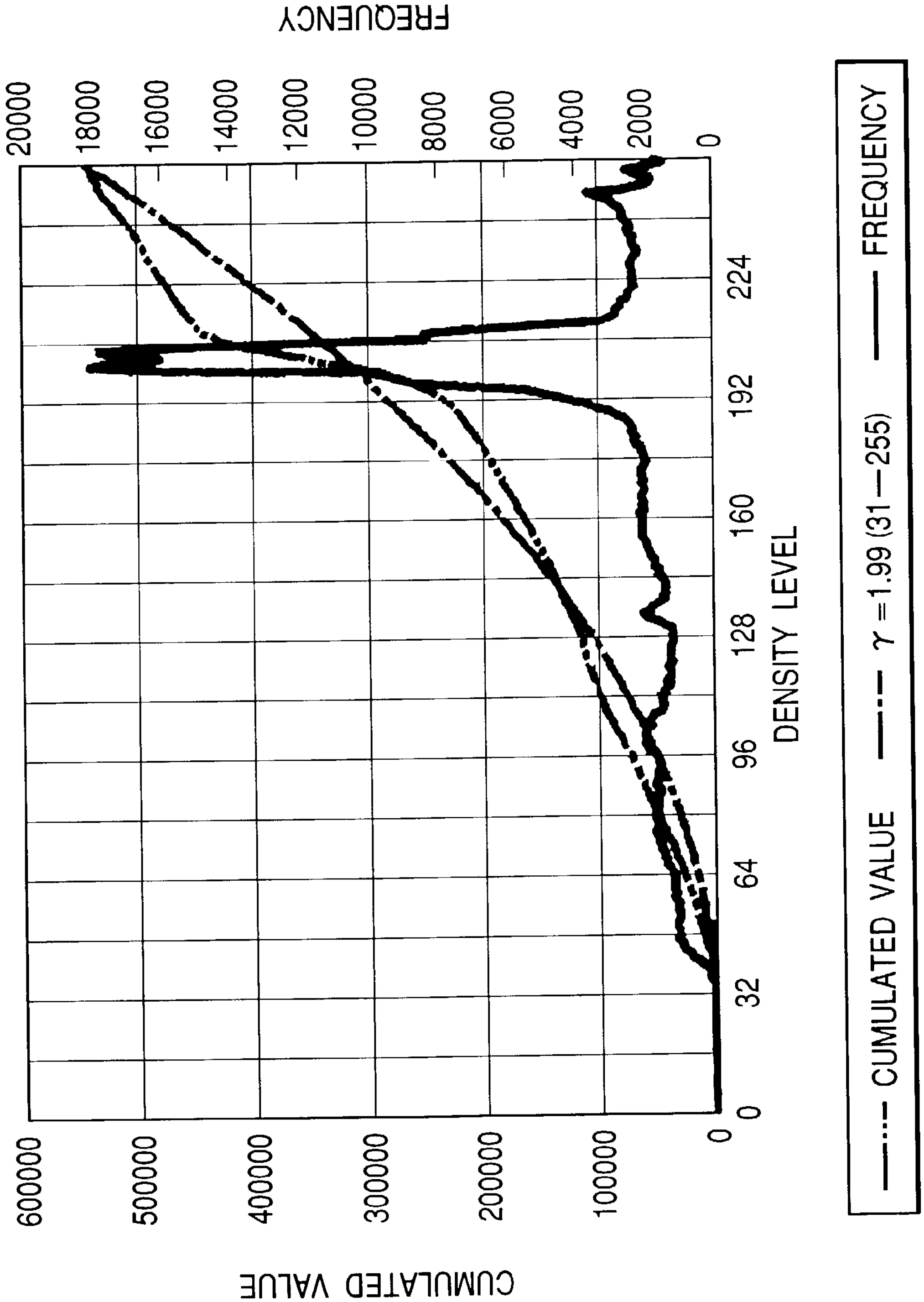
FIG. 13 is a view showing the outline of γ coefficient calculation process for preview in an embodiment of the present invention.

FIG. 12 shows a routine for preparing gamma correction data for a photograph original, in the step S307 shown in FIG. 3. Also FIG. 13 shows a specific example of γ coefficient calculation in case of an original having a certain density distribution.

Referring to FIG. 12, a step S1201 prepares density frequency distributions of the respective colors, and adds thus prepared density frequency distributions of the respective colors to obtain a synthesized frequency distribution of all the color components. It is assumed that the density values of the respective colors are in a color-balanced state.

Then a step S1202 searches, from the side of the density 0 (namely black) in the synthesized density frequency distribution of all the colors, a minimum density value (hereinafter called shadow value) and a maximum density value (hereinafter called highlight value) at which the frequency distribution actually exists, and a step S1203 calculates the cumulative value of the frequencies of the respective densities, from the minimum value toward the maximum value, as a function of the density value. As a result, there is obtained a cumulative value h(d) as a function of the density value d.

Then a step S1204 compares the calculated cumulative value of the frequency of the density, or the curve h(d) represented by the cumulative value, with the value of the following function:

$$g(d)=M(d-\text{shadow})\hat{}G$$

to determine the exponent G of an approximating exponential function by the least square method, and M is an arbitrary number used for matching the maximum value in approximation. As the curve h(d) represented by the cumulative value and to be actually compared with the aforementioned equation, in case of 8-bit representation, there is used h' (d) in which a range less than the shadow value is normalized to 0 and a range equal to or higher than the highlight value is normalized to 255.

FIG. 13 shows an example in which a curve of γ=1.99 determined by the above-described method is superposed with the cumulative values within a range of 31 to 255. In making such superposition, the curve of the exponential function is so normalized as to pass through the maximum value of the cumulative value.

In this manner there can be obtained an exponential function which uniquely converting the density distribution, namely γ-coefficient. However, since there may occur a case where the tonal gradation of the original image is lost depending on the content of the original image, a certain parameter T is employed to apply an operation on the preview image with:

$$\text{Preview image } \gamma\text{-coefficient}=(G\hat{}T),\ 0<T<1.0$$

The parameter T is to further control the level of density correction, in addition to the γ-coefficient calculated from the density distribution of the preview image. Such parameter T, in case of 1.0, provides a correction amount of zero by such parameter T, but provides a larger correction amount as the parameter T becomes closer to 0. In the entire correction amount, T=1 provides the largest correction and corrects the density distribution of the original in most uniform manner, while T=0.0 provides a zero correction amount and does not affect the input density distribution. The default value is T=1. In such case, the density conversion table directly adopting the calculated γ-coefficient is prepared and used.

Figure 14:
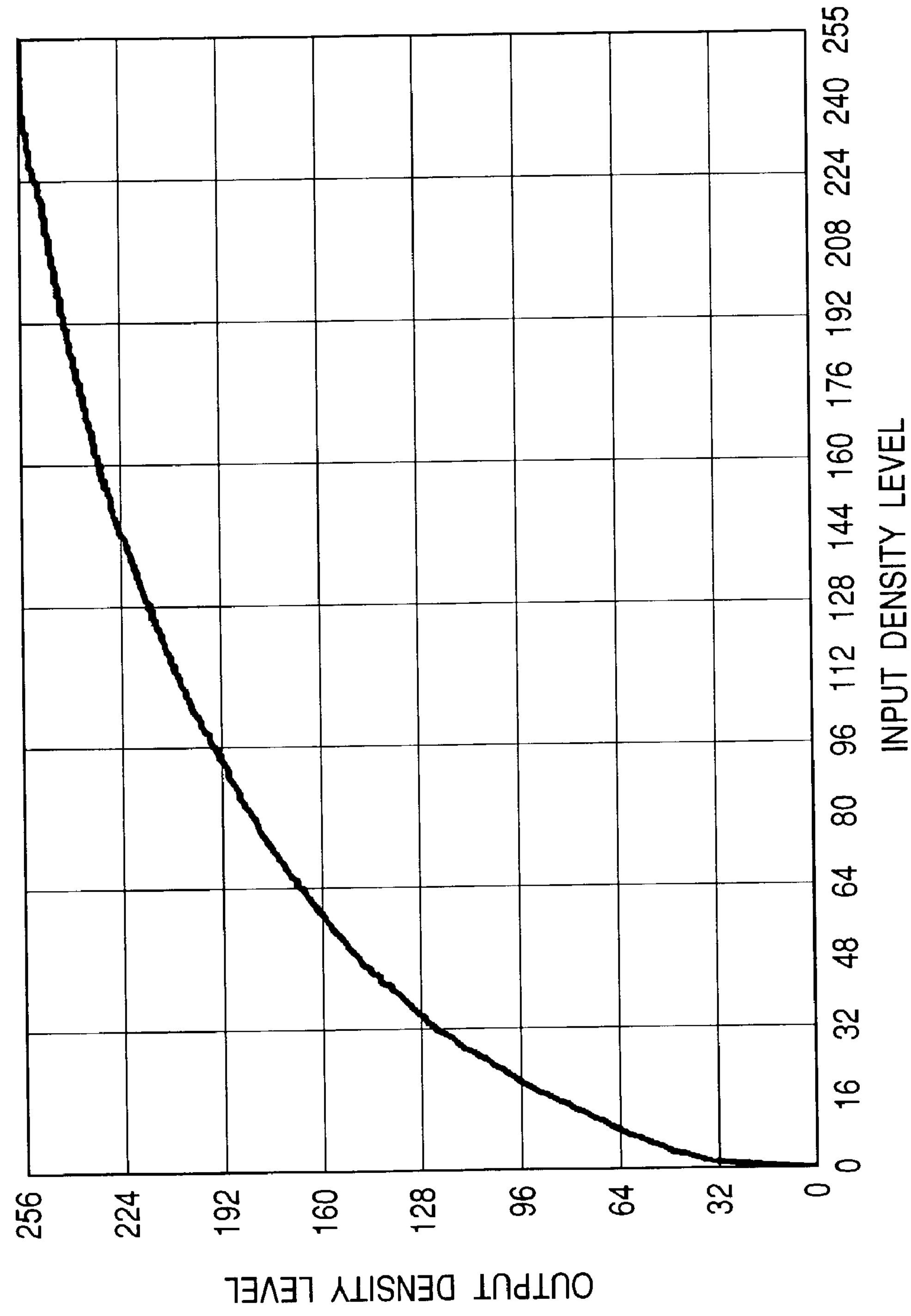
FIG. 14 is a view showing an example of a γ table suitable for a photograph original and obtained in an embodiment of the present invention.
Figure 15:
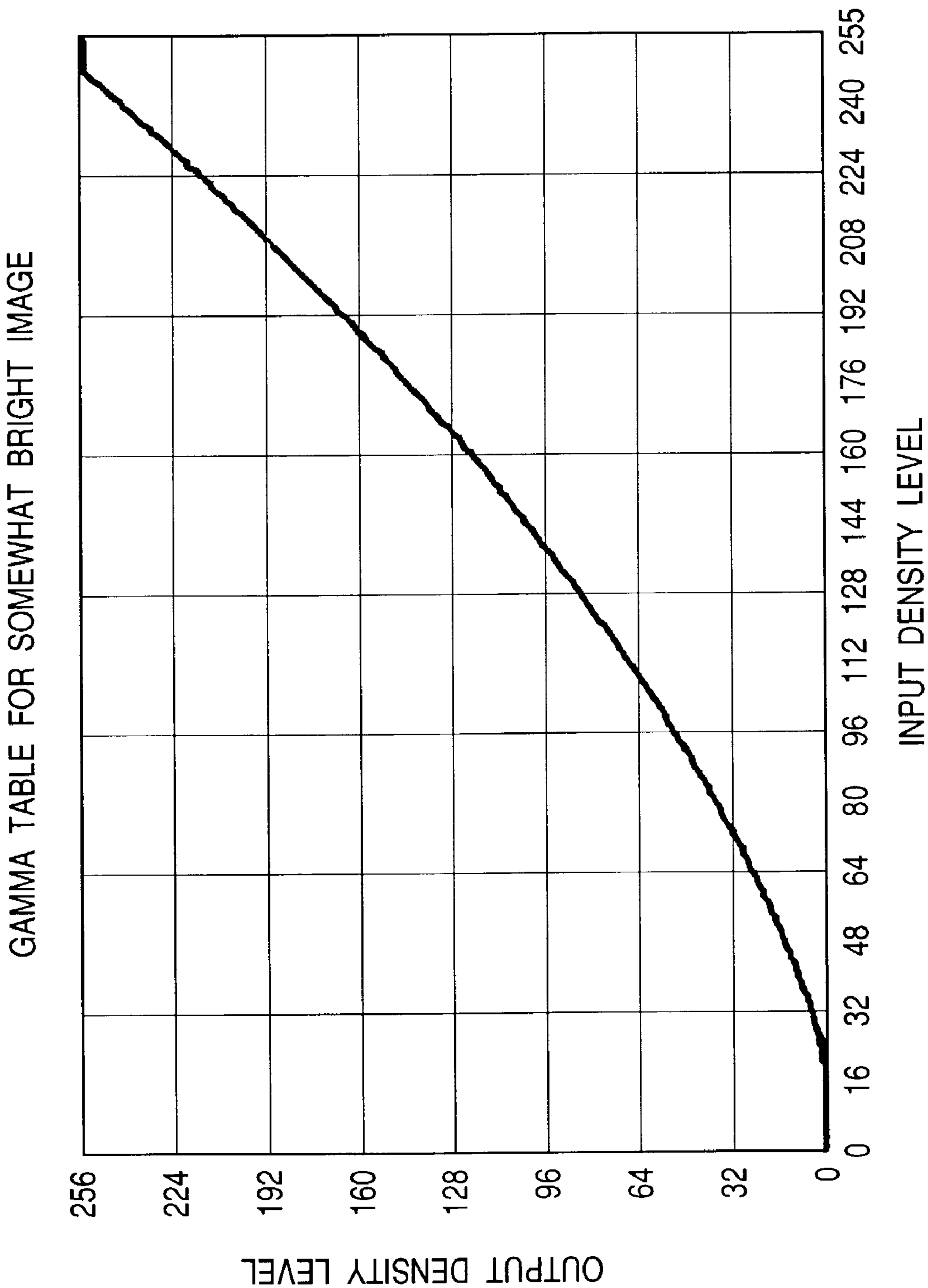
FIG. 15 is a view showing another example of the γ table suitable for a photograph original and obtained in an embodiment of the present invention.

The γ-table, based on thus obtained γ-coefficient, generally assumes a form shown in FIG. 14 or in FIG. 15. For example, if the density distribution is heavily deviated toward the black side, there are obtained gamma characteristics as shown in FIG. 14 (gamma≅0.24), but, if the density distribution is somewhat deviated toward the white side, there are obtained gamma characteristics as shown in FIG. 15 (gamma≅1.6). FIGS. 14 and 15 show a case where the minimum value of the density distribution is 0 in 8-bit presentation (00h in hexadecimal presentation) while the maximum value is 255 in 8-bit presentation (FFh in hexadecimal presentation), with the abscissa and the ordinate respectively indicating the input density level and the output density level.

The above-described algorithm of preparing the density conversion table allows to obtain a density conversion table capable of increasing the contrast of a density area (range) in which the frequency distribution is concentrated, thereby realizing conversion to an image with rectified gradation.

In the following there will be given a detailed explanation on the γ-coefficient calculating procedure for main scan in the present embodiment, with an example of a γ-coefficient reflection table corresponding to the resolution designated for the main scan and to be used for a photograph original in the step S114 in FIG. 3 and a density distribution chart of the image data at a high resolution.

Figure 16:
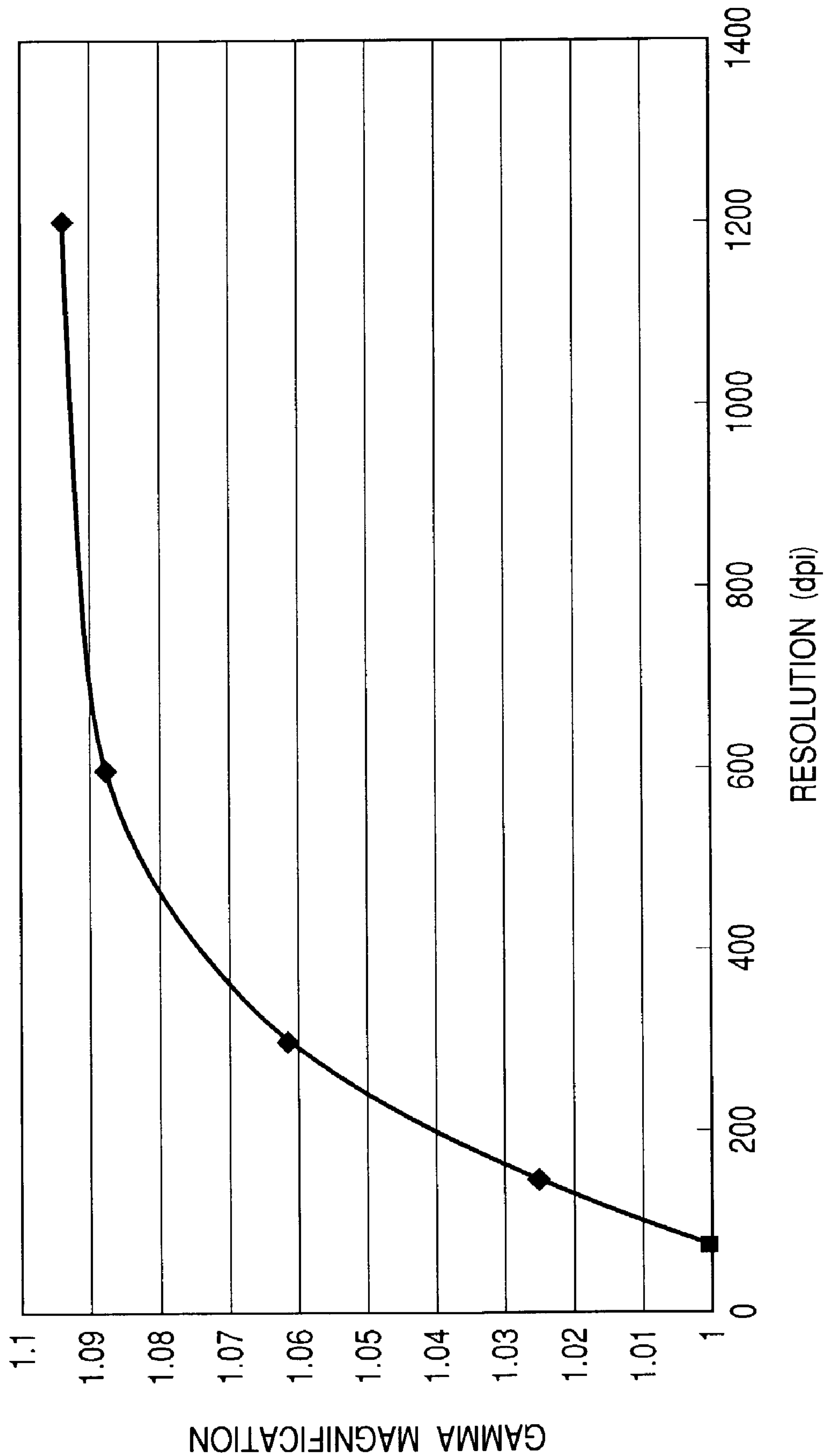
FIG. 16 is a view showing a γ reflection table for main scanning in an embodiment of the present invention.

FIG. 16 shows a γ-coefficient reflection table for main scan in the present embodiment. This chart shows the experimentally determined change of γ-magnification depending on the resolution, in reading a photograph original. The chart indicates, for example, the γ-value optimum for a photograph original of a resolution of 600 dpi becomes 1/1.087 for a resolution of ⅛, or, stated differently, the optimum γ-value form an image obtained by reading the original with a resolution of 75 dpi should be multiplied by 1.087 for obtaining the optimum γ-value for original reading with 600 dpi.

At first, the resolution at the pre-scan operation and the resolution for main scan to be designated by the operator are entered into the conversion table shown in FIG. 16, and a γ-coefficient magnification Kg for main scan, corresponding to the γ-value at the pre-scan, is determined. Then the γ-coefficient G' for main scan is calculated from such γ-coefficient magnification Kg and the preview γ-coefficient G determined in advance, according to the following equation:

$$G' = Kg \times G$$

For the input image data in the main scan, a γ-table is prepared utilizing the γ-coefficient G' for main scan in a similar manner as in the preparation of the preview γ-table, and thus prepared γ-table is used for executing the density conversion of the image read in the main scan to achieve optimum conversion of the density gradation optimum for the reading resolution.

Figure 17:
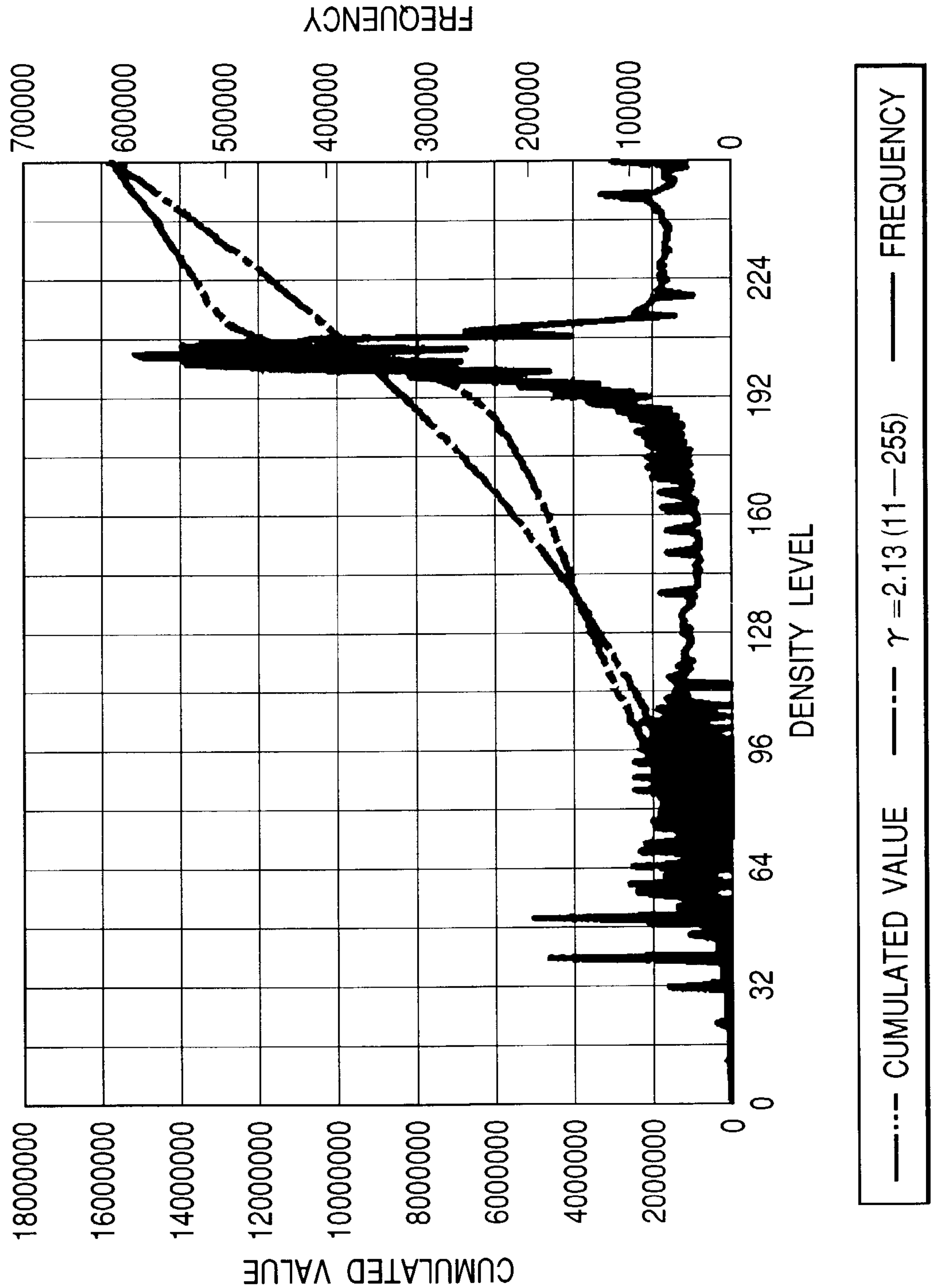
FIG. 17 is a view showing the density frequency distribution and the cumulative frequency distribution of main scan input image data in an embodiment of the present invention.

FIG. 17 shows the density distribution of image data, obtained by reading an original same as in the case of FIG. 13 but with a resolution of 400 dpi which is higher than in the case of FIG. 13. In FIG. 17, the distribution has a γ-value of 2.13 and lies within a range of density levels of 11 to 255. In FIG. 13, the distribution has a γ-value of 1.99 and lies within a range of density levels of 31 to 255. In the preview image of a relatively low reading resolution as shown in FIG. 13, the density distribution comes closer to the average value with the nearby pixel data, thus assuming a smoother histogram shape with a certain change in the distribution, in comparison with the density distribution of the main scan image as shown in FIG. 17. It will therefore be understood that the optimum density conversion table varies according to the resolution, even for a same photograph original. More specifically, there are generated changes in the density range and in the frequency distribution. As will be understood from FIGS. 13 and 17, the total number of pixels in the pre-scan shown in FIG. 13 is about 540,000 based on the maximum value of the cumulative value, while that in the main scan shown in FIG. 17 is about 15,800,000 based on the maximum value of the cumulative value. It will therefore be understood that the data amount in pre-scan is reduced, to shorten reducing the process time, to about 1/29 of that in the main scan.

As explained in the foregoing, the image processing apparatus of the present embodiment is capable of preparing a density conversion table optimum for the image and optimizing the density gradation, by determining the cumulative frequency distribution from the synthesized density frequency distribution in the designated area on the input original image, then calculating an exponential function approximating the cumulative frequency distribution, and calculating a γ-coefficient corresponding to the designated main scanning resolution from the exponent of the exponential function.

Figure 18:
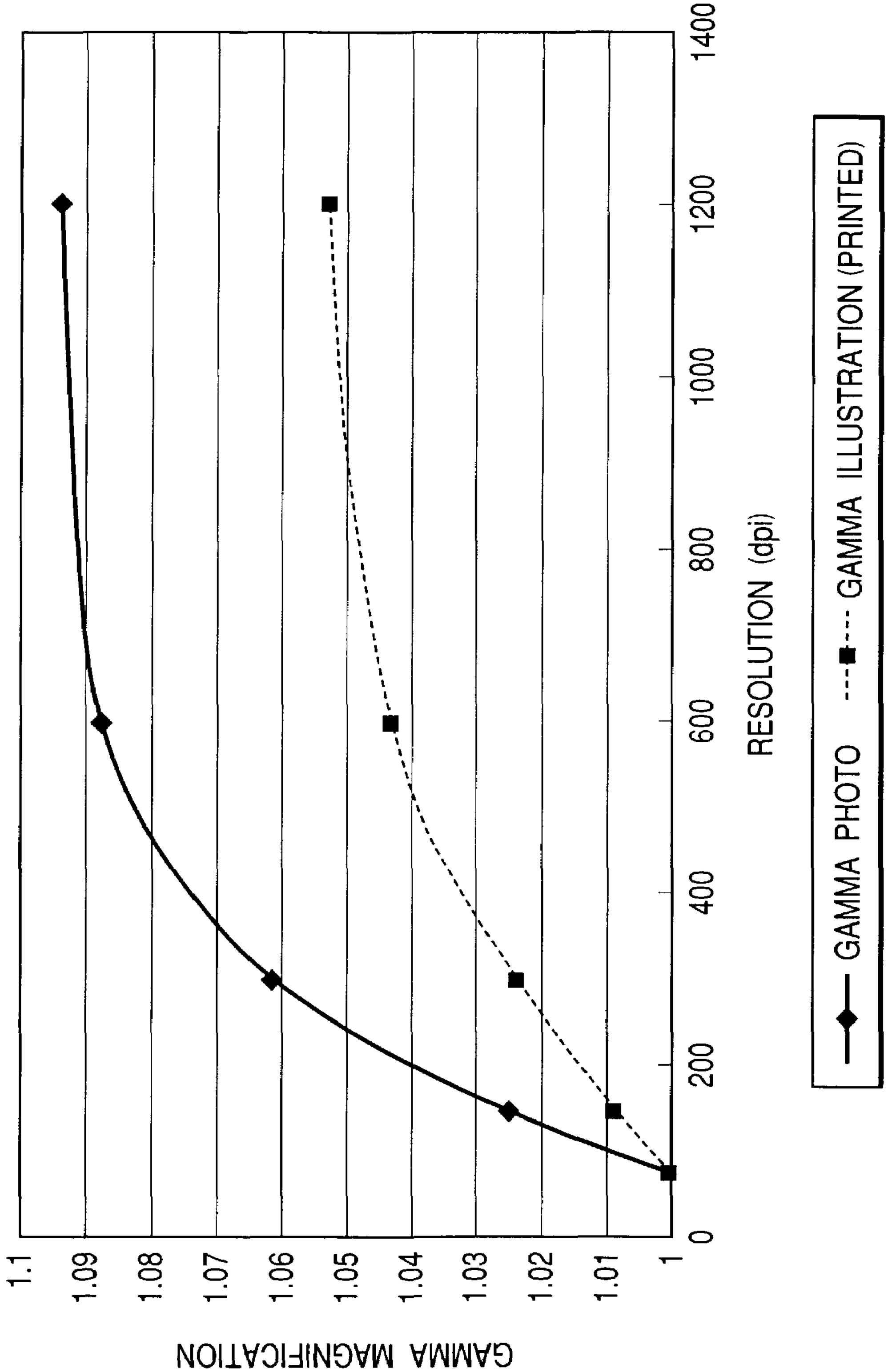
FIG. 18 is a view showing a table obtained by expanding the γ reflection table for main scanning in an embodiment of the present invention.

FIG. 18 shows a table expanded from the γ-coefficient reflection table for main scan, for an original having a different feature. The curves for a photograph original and an illustrated original show the changes in γ-magnification, depending on the experimentally determined resolution at the original reading. Since the illustrated original generally has a larger area consisting of a uniform color in comparison with the photograph original, the γ-coefficient shows a smaller change in the transition toward the high resolution. Thus, such tables can be suitably selected for example in case the kind of the original is discriminated as an illustrated original (S108 in FIG. 3 in the above-described embodiment) or in case the operator enters that the original is an illustrated original.

Figure 19:
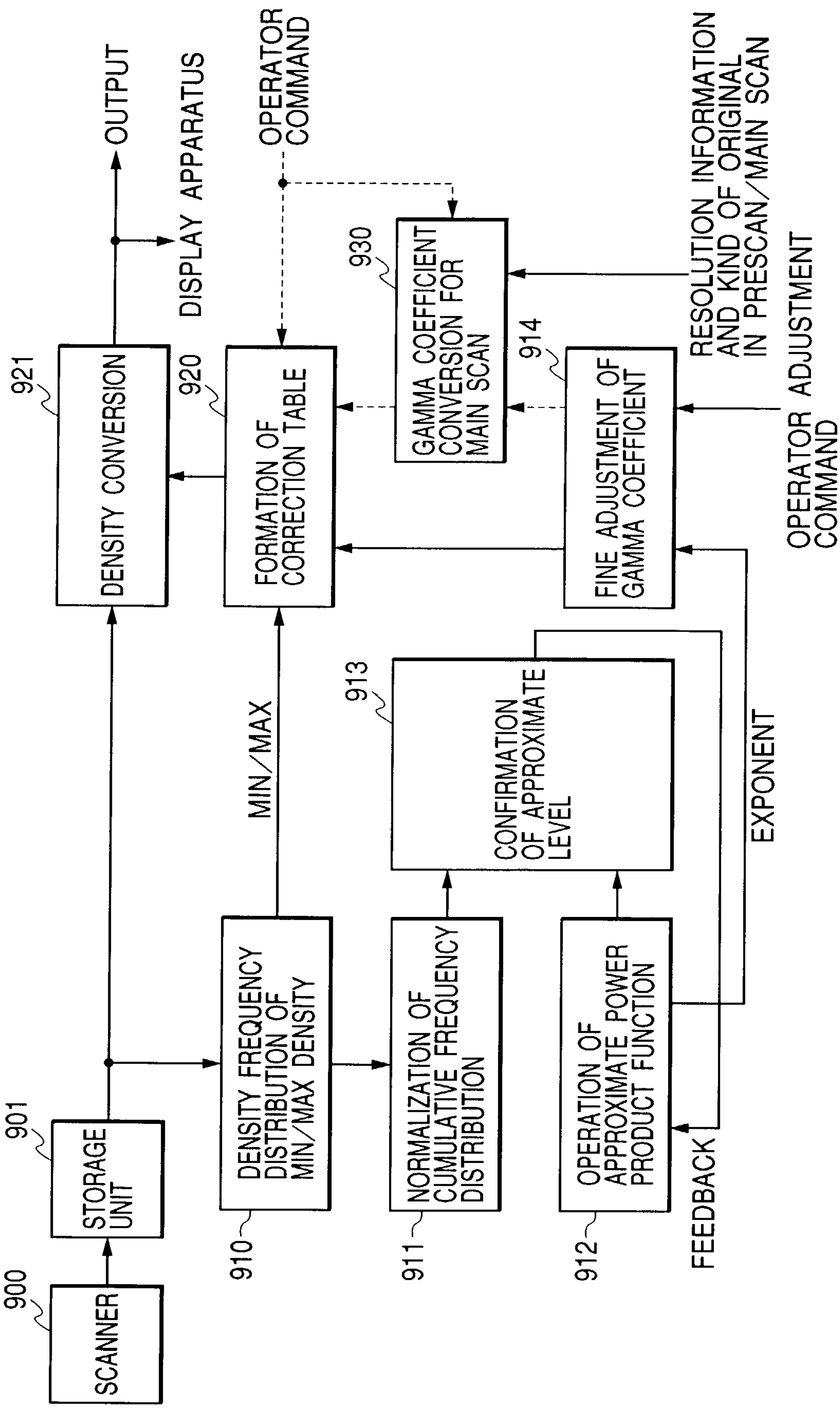
FIG. 19 is a block diagram showing a photograph original processing of the present invention.

FIG. 19 is a block diagram for facilitating the understanding of the present invention in the foregoing embodiment. Referring to FIG. 19, image data from a scanner 900 are temporarily stored in a storage unit 901 composed of a large-capacity memory medium such as a hard disk. The stored data are entered into a density conversion unit 921, and to a block 910 for calculating a tone correction coefficient to be used in the density conversion executed in the density conversion unit 921. The output of the density conversion unit 921 is supplied to a display apparatus, or stored in a storage apparatus, or supplied to an output apparatus such as a printer.

Blocks 910 to 913 process a pre-scan image obtained by pre-scan to obtain a tone correction coefficient suitable for the pre-scan image. In these blocks, the exponent of an approximation exponential function is finally obtained as a γ-value indicating the tone correction coefficient.

A block 910 receives the pre-scan image, determines the minimum and maximum values of the pixel data and calculates the density frequency distribution. The obtained minimum and maximum density values are supplied to a correction table preparation unit indicated by a block 920.

Also the data of the density frequency distribution are subjected to the preparation of a cumulative frequency distribution in a block 911, and, since the minimum and maximum values of such cumulative frequency distribution are determined specifically for the original image and the pre-scan condition, there is prepared a cumulative frequency distribution normalized to a predetermined range, for example a range from a minimum value of 0 to a maximum value of 255. The data of such normalized cumulative frequency distribution are entered into an approximation level confirming block 913. Receiving the data from the block 911, the block 913 controls a block 912 for calculating an approximation exponential function and finally determines the exponent of the approximation exponential function, utilizing the least square method.

The exponent from the block 912 is supplied, as the tone correction coefficient or γ-coefficient, to a block 914 which corrects the γ-coefficient obtained from the pre-scan image under fine adjustment according to the instruction from the operator as explained in the foregoing. However, immediately after the pre-scan operation, the entered γ-coefficient is transferred to the block 920 without change, and then is used for preparing the correction table, in this case a correction table for pre-scan image, based on the input data from the block 910 including the minimum and maximum values of the density values. The prepared correction table is transmitted to the block 921 for executing the density conversion of the pre-scan image therein. The data after the density conversion, in case of a pre-scan image, are transferred to the display apparatus to be presented to the operator. The operator observes the presented image, and, if necessary, manipulates the block 914 to execute fine adjustment of the γ-coefficient value.

In the procedure explained in the foregoing, the blocks 920, 921 are used for processing the pre-scan image. When a main scan is instructed from the operator in response to the result of the above operation or process, the blocks 910, 920, 921 executes a process on the main scan image. At first, at the reception of the instruction for the main scan from the operator, the γ-coefficient for the pre-scan image, stored in the block 914, is the tone correction coefficient which has been confirmed for the pre-scan image by the operator on the display apparatus, or has been finally accepted by the operator after fine adjustment. Such tone correction coefficient (γ-coefficient) is entered into a block 930 for converting the γ-coefficient for main scan, which also receives the resolution at the pre-scan operation, the resolution at the main scan operation and the information on the kind of the original, and is converted into a γ-coefficient for main scan. At the main scan operation, the block 920 receives the γ-coefficient from the block 930.

At the same time, the scanner 900 scans the original image under the condition for the main scan, and stores the main scan image in the storage unit 901. Thereafter the block 910 reads the data from the storage unit, then acquires the minimum and maximum values of the density level and transmits these data to the block 920, as in the pre-scan operation.

Receiving the minimum/maximum values from the block 910 and the main scan γ-value from the block 930, the block 920 prepares a density correction table for density conversion of the main scan image. Thus prepared density correction table is used in the block 921 for the density conversion of the main scan image, and the converted main scan image is outputted for example to the printer or the storage apparatus.

In the block 920, the correction table is prepared in the following manner. For example, with the γ-coefficient alone from the block 914 or the block 930, there can only be obtained the conversion characteristics as shown in FIGS. 14 and 15. With such conversion characteristics, a density distribution for example within a density level range of 31 to 255 (in 8-bit presentation) as shown in FIG. 3 will be converted into a density range of about 110 to 255 in case of the conversion characteristics shown in FIG. 14 or into a density range of about 9 to 255 in case of the conversion characteristics shown in FIG. 15. The block 920 receives the minimum/maximum values in order to apply a curve as shown in FIG. 14 or FIG. 15 to the range of the entered density levels, instead of the above-mentioned conversion. More specifically, synthesized conversion characteristics are obtained by providing an output 0 to the input density levels of 0 to 30 as indicated by the curve of γ=1.99 shown in FIG. 13 and, for the input density values within a range of 31 to 255, by compressing the curve of γ=1.99 by a ratio of (256−31)/256=0.879 in the horizontal direction as shown in FIG. 15.

In case the conversion table is prepared in the above-explained manner, the minimum density level, for example level 31, can be converted into an output density level 0. Thus, in such conversion, the density range can be expanded in comparison with the case of no conversion. It is also possible to execute the conversion in such a manner that the minimum density level after the conversion becomes equal to that before the conversion.

In the foregoing description, the density conversion of the main scan image is executed after the synthesis of the monitoring γ-characteristics only in case of a text original, but a similar process is applicable also to a photograph original, and the density conversion may also be executed without the synthesis of the γ-characteristics of a monitor device.

The present invention can naturally be attained also by supplying a system or an apparatus with a memory medium storing program codes of a software realizing the functions of the aforementioned embodiments and causing a computer (or CPU or MPU) of such system or apparatus to read and execute the program codes stored in the memory medium.

In such case, the program codes themselves read from the memory medium realize the novel functions of the present invention, and the memory medium storing the program codes constitutes the present invention.

The memory medium for supplying the program codes can be, for example, a floppy disk, a hard disk, a magnetooptical disk, an optical disk, a CD-ROM, a CD-R, a magnetic tape, a non-volatile memory card or a ROM.

The functions of the aforementioned embodiments can be realized not only in a case where the computer executes the read program codes but also a case where an operating system or the like functioning on the computer executes all the actual processes or a part thereof under the instructions of the program codes, thereby realizing the functions of the aforementioned embodiments.

The functions of the aforementioned embodiments can also be realized in a case where the program codes read from the memory medium are once stored in a memory provided in a function expansion board inserted into the computer or a function expansion unit connected thereto, and a CPU or the like provided on such function expansion board or function expansion unit executes all the actual processes or a part thereof under the instructions of such program codes.

The present invention is naturally further applicable to a case where the program codes realizing the novel functions of the aforementioned embodiments are distributed, from a memory medium storing such program codes, to a requesting person through a communication line.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing method comprising the steps of:

detecting the density difference of each pixel in the input image from an adjacent pixel;

generating a histogram of the density differences detected in said density difference detecting step;

generating a function approximating the histogram generated in said histogram generation step wherein said approximation function generation step includes a logarithmic conversion step of converting the histogram generated in said histogram generation step into a logarithmically represented histogram, and an approximation first-order function generation step of generating a first-order function approximating the histogram converted into a logarithmic representation in said logarithmic conversion step, and discriminating the kind of said input image from a coefficient of the function generated in said approximation function generating step.

2. A method according to claim 1, further comprising:

a density conversion step of applying a density conversion process corresponding to the result of discrimination in said image kind discrimination step, to said input image.

3. An image processing method comprising the steps of:

detecting the density difference of each pixel in the input image from an adjacent pixel;

generating a histogram of the density differences detected in said density difference detecting step;

generating a function approximating the histogram generated in said histogram generation step, discriminating the kind of said input image from a coefficient of the function generated in said approximation function generating step; and a density conversion step of applying a density conversion process corresponding to the result of discrimination in said image kind discrimination step, to an image obtained by reading an original of said input image, with a resolution different from that of said input image.

4. A computer readable storage medium which stores a computer readable program for realizing an image processing method, the method comprising the steps of:

detecting the density difference of each pixel in the input image from an adjacent pixel;

generating a histogram of the density differences detected in said density difference detecting step;

generating a function approximating said histogram generated in said histogram generation step by converting said histogram into a logarithmically represented histogram, and generating a first-order function approximating the histogram converted into the logarithmically represented histogram; and discriminating the kind of said input image from a coefficient of the function generated in said approximation function generating step.

5. An image processing apparatus comprising:

a density difference detecting circuit, arranged to detect the density difference of each pixel in the input image from an adjacent pixel;

a histogram generating circuit, arranged to generate a histogram of the density differences detected in said density difference detecting circuit;

an approximation function generating circuit, arranged to generate a function approximating said histogram generated in said histogram generating circuit by converting said histogram into a logarithmically represented histogram, and generating a first-order function approximating the histogram converted into the logarithmically represented histogram; and an image kind discriminating circuit, arranged to discriminate the kind of said input image from the coefficient of a function generated in said approximation function generating circuit.

* * * * *

UNITED STATES PATENT AND TRADEMARK OFFICE

CERTIFICATE OF CORRECTION

PATENT NO. : 7,016,534 B2
APPLICATION NO. : 10/211520
DATED : March 21, 2006
INVENTOR(S) : Kimihiko Fukawa et al.

It is certified that error appears in the above-identified patent and that said Letters Patent is hereby corrected as shown below:

ON THE TITLE PAGE ITEM (54) TITLE

"METHOD," should read --METHOD--.

IN THE DRAWINGS

SHEET 1

FIG. 13, "CUMULATED" (both occurrences) should read --CUMULATIVE--.

SHEET 16

FIG. 17, "CUMULATED" (both occurrences) should read --CUMULATIVE--.

COLUMN 1

Line 1, "METHOD," should read --METHOD--; and
Line 53, "is" should read --are--.

COLUMN 5

Line 10, "of the" should read --wherein the--.

COLUMN 11

Line 38, "executes" should read --execute--.

Signed and Sealed this

Fourteenth Day of November, 2006

JON W. DUDAS
*Director of the United States Patent and Trademark Office*